US010537985B2

(12) United States Patent
Jatekos et al.

(10) Patent No.: US 10,537,985 B2
(45) Date of Patent: Jan. 21, 2020

(54) METHOD AND DEVICE FOR ASCERTAINING THE ORIENTATION OF A DRILL RELATIVE TO A PLANE

(71) Applicant: Robert Bosch GmbH, Stuttgart (DE)

(72) Inventors: Balazs Jatekos, Budapest (HU); Benno Roesener, Stuttgart (DE); Christian Ohl, Pfullingen (DE); Dominik Neeser, Reutlingen (DE); Hans-Joerg Faisst, Kirchentellinsfurt (DE); Juergen Class, Bempflingen (DE); Philipp Troebner, Boeblingen (DE); Robert Kakonyi, Kalocsa (HU); Timon Brueckner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 15/625,232

(22) Filed: Jun. 16, 2017

(65) Prior Publication Data
US 2017/0361452 A1 Dec. 21, 2017

(30) Foreign Application Priority Data

Jun. 20, 2016 (DE) .................. 10 2016 210 942

(51) Int. Cl.
*B25H 1/00* (2006.01)
*G01S 17/08* (2006.01)
*B23B 45/00* (2006.01)

(52) U.S. Cl.
CPC ............ *B25H 1/0092* (2013.01); *G01S 17/08* (2013.01); *B23B 45/00* (2013.01); *B23B 2260/092* (2013.01); *B23B 2270/34* (2013.01)

(58) Field of Classification Search
CPC ..... B25H 1/0092; G01S 17/08; G01S 17/875; B23B 49/00; B23B 45/00; B23B 2260/092; B23B 2270/34; B25F 5/021

USPC ......................................................... 356/4.01
See application file for complete search history.

(56) References Cited

U.S. PATENT DOCUMENTS

| 7,872,394 B1* | 1/2011 | Gritters | .................. H02N 1/006 216/6 |
| 2016/0022374 A1* | 1/2016 | Haider | ................... A61B 17/17 606/96 |
| 2017/0120408 A1* | 5/2017 | Reese | ........................ B25F 5/00 |

FOREIGN PATENT DOCUMENTS

DE 202008016901 U1 3/2009

OTHER PUBLICATIONS

Pololu.com, "VL6180X Time-of-Flight Distance Sensor Carrier with Voltage Regulator, 60cm max," 2019, downloaded Jul. 20, 2019 from https://www.pololu.com/product/2489, 8 pp. (Year: 2019).*

* cited by examiner

*Primary Examiner* — Daniel L Murphy
(74) *Attorney, Agent, or Firm* — Norton Rose Fulbright US LLP; Gerard Messina

(57) ABSTRACT

A device for ascertaining the orientation of a drill relative to a plane, the device being capable of being connected to the drill, the device having a laser distance measuring unit by which, from a prespecified position relative to the plane, a first distance to a first point in the plane and a second distance to a second point in the plane can be measured, and having an evaluation unit that is configured such that on the basis of the first distance and the second distance the orientation of the device relative to the plane can be ascertained.

11 Claims, 6 Drawing Sheets

METHOD AND DEVICE FOR ASCERTAINING THE ORIENTATION OF A DRILL RELATIVE TO A PLANE

CROSS REFERENCE

The present application claims the benefit under 35 U.S.C. § 119 of German Patent Application No. DE 102016210942.1 filed on Jun. 20, 2016, which is expressly incorporated herein by reference in its entirety.

FIELD

The present invention is based on a device for ascertaining the orientation of a drill relative to a plane, and to a method.

CROSS REFERENCE

When drilling holes in walls or in workpieces having a flat surface, it is standardly desirable for the drilled holes to be oriented perpendicular to the plane of the surface. Conventional methods are available for supporting the user of the drill in the orientation of the drill or drill bit. These methods require that the orientation of the drill relative to the plane of the wall or workpiece surface be ascertained.

In order to ascertain the orientation of a drill, German Patent Application No. DE 20 2008 016 901 U1 provides, in a handle of the drill, an angular inclination sensor that has a miniature level that is optically monitored using photodiodes. Via this angular inclination sensor, the inclination of the drill relative to a plane running parallel to the force of gravity, i.e., a perpendicular plane, can be ascertained. However, it has turned out to be disadvantageous that the orientation of the drill cannot be ascertained relative to those walls and workpieces whose surface has an inclination relative to the perpendicular.

SUMMARY

An object of the present invention is to simplify the orientation of a drill relative to a wall plane or workpiece plane that has an inclination relative to the perpendicular.

This object may achieved by a device, a drill, and a method in accordance with the present invention. According to the present invention, the orientation of the device or of the drill relative to the plane can be defined on the basis of the respective distance of the device from three different points in the plane that do not lie on a common straight line. According to the present invention, it is provided to determine at least two of these three distances using a laser distance measuring unit. On the basis of the measured first distance and the measured second distance, as well as, preferably, additional input values—such as a third distance from a third point in the plane that does not lie on a common line with the first and the second point—the orientation of the device relative to the plane can be ascertained. The device, the drill, and the method according to the coordinate claims have the advantage that it is not necessary to measure physical quantities that are a function of the orientation of gravitational force. In this way, an orientation of the drill can also be ascertained relative to a plane that has an inclination relative to the perpendicular. On the basis of the information for orienting the drill, the user can be guided when orienting the drill so that the orientation of the drill relative to the plane is facilitated.

The device according to the present invention can be connected to the drill. Preferably, the device is fashioned in such a way that it can be situated inside a housing of a drill. Alternatively, the device can have a connecting region that is fashioned in such a way that the device can be connected to an outer contour of a drill. In this way, the device can be fashioned in the manner of an add-on part that can be situated on a drill as a retrofit solution.

The laser distance measuring unit can have one or more laser distance meters that are fashioned such that a distance from a point of the plane can be measured by self-mixing of the laser light emitted by the laser distance meter with the laser light reflected on the plane. The laser distance meter or meters are preferably fashioned as semiconductor lasers, in particular as vertical-cavity surface-emitting lasers (VCSEL). The semiconductor laser preferably has an integrated photodiode via which an optical or electrical quantity can be measured. In addition, the laser distance measuring unit can include a micromirror preferably fashioned as a MEMS (micro-electromechanical system).

According to a preferred embodiment, the laser distance measuring unit has a first laser distance meter for measuring the first distance and a second laser distance meter for measuring the second distance. Using the two laser distance meters, the first and the second distance can be ascertained simultaneously. The two laser distance meters are preferably oriented transverse to one another, so that the measurement can take place in two spatial directions oriented transverse to one another. In order to ascertain the orientation of the drill relative to the plane, preferably a third distance to a third point in the plane is used. According to a preferred embodiment of the method, the third distance is a prespecified distance that corresponds to the distance of the device, or of the laser distance measuring unit, from the plane in a position of the drill in which a drill bit of the drill touches the plane. In this way, it is possible to determine the orientation of the drill when the drill bit is placed onto the plane.

According to an alternative preferred embodiment, the laser distance measuring unit has a first laser distance meter and a first micromirror, which can be pivoted about a first pivot axis, for deflecting a laser beam of the first laser distance meter. Via the first micromirror, the laser beam of the first laser distance meter can be deflected along a straight line so that the first distance and the second distance can be measured one after the other. In order to ascertain the orientation of the drill relative to the plane, preferably a third distance from a third point in the plane is used. According to a preferred embodiment of the method, the third distance is a prespecified distance that corresponds to the distance of the device, or of the laser distance measuring unit, from the plane in a position of the drill in which a drill bit of the drill touches the plane. In this way, it is possible to determine the orientation of the drill when the drill bit is placed onto the plane.

It is preferable if, from the prespecified position relative to the plane, a third distance from a third point in the plane can be measured using the laser distance measuring unit, the third point not being situated on a common straight line with the first point and the second point, and the evaluation unit being configured such that the orientation of the device relative to the plane can be additionally ascertained on the basis of the third distance. Given such a realization, the distances to three points in the plane can be measured using only the laser distance measuring unit. It is therefore possible to determine the orientation of the drill relative to the plane of the wall or of the workpiece even when a drill bit of the drill is already partly situated in the drilled hole in the wall or in the workpiece.

Below, advantageous embodiments of the present invention are described in which a third distance from a third point of the plane can be measured using the laser distance meter.

An advantageous embodiment provides that the laser distance measuring unit has a third laser distance meter for measuring a third distance between the device and a third point in the plane. According to a preferred embodiment of the method, the third distance to the third point is measured from the prespecified position relative to the plane. The third laser distance meter is preferably oriented transverse to the first laser distance meter and transverse to the second laser distance meter, and as a result it is possible to measure distances to three points in the plane that do not lie on a common straight line.

In an embodiment in which the laser distance measuring unit has a first laser distance meter and a first micromirror, pivotable about a first pivot axis, for deflecting a laser beam of the first laser distance meter, it is advantageous if the laser beam can be radiated in a direction of radiation by the first laser distance meter and the first pivot axis of the first micromirror encloses an acute angle with the direction of radiation. In such an embodiment, the laser beam deflected by the micromirror can move over a curved path on the plane, so that it is possible to measure the distances to three or more different points in the plane one after the other that are not situated on a common straight line. According to a preferred embodiment of the method, the laser beam of the first laser distance meter, radiated in a direction of radiation, is deflected by a first micromirror, the pivot axis of the first micromirror enclosing an acute angle with the direction of radiation.

In this connection, it is alternatively or additionally preferred if the laser distance measuring unit has a second laser distance meter and a second micromirror, pivotable about a second pivot axis, for deflecting a laser beam of the second laser beam meter. The second pivot axis is preferably oriented transverse to the first pivot axis, so that the laser beam of the first laser beam meter can be deflected along a first path, in particular a straight or curved path, and the laser beam of the second laser distance meter can be deflected along a second, in particular straight or curved, path, the first path and the second path being oriented transverse to one another. Alternatively, the first micromirror can be pivotable about a further pivot axis that is situated transverse, in particular perpendicular, to the pivot axis of the first micromirror. In this way, a laser distance meter can be formed having a laser beam that can be deflected in two dimensions.

According to an advantageous embodiment, the laser distance measuring unit includes a diverting optical mechanism, situated in the beam path after the first micromirror, for diverting the laser beam deflected by the first micromirror. Using the diverting optical mechanism, the laser beam can be diverted in such a way that the laser beam diverted by the diverting unit moves over a non-linear path on the plane. The non-linear path can for example be an angled path or a curved path.

In this connection, it is preferred if the diverting optical mechanism has a prism. Via the prism, the laser beam can be diverted by refraction or by total reflection. Alternatively or in addition, the diverting element can have one or more stationary diverting mirrors via which the laser beam can be reflected. Further, alternatively or in addition, the diverting optical mechanism can have a second micromirror that can be pivoted about a further pivot axis that is oriented transversely, in particular perpendicular, to the pivot axis of the first micromirror.

According to an advantageous embodiment, the device additionally has an orientation sensor via which the orientation of the device in space can be ascertained. Preferably, the evaluation unit is configured such that the orientation of the device relative to the plane can be ascertained in addition on the basis of the orientation of the device in space. The orientation sensor can have an acceleration sensor and/or a rotational rate sensor and/or a magnetometer. Particularly preferably, the orientation sensor is fashioned as a MEMS. According to a preferred embodiment of the method, the orientation of the drill relative to the plane is ascertained on the basis of the first distance and the second distance, and on the basis of the orientation of the device in space measured using the orientation sensor.

In addition, the object is achieved by a device for ascertaining the orientation of a drill relative to a plane, the device being capable of being connected to the drill, the device having an orientation sensor via which the orientation of the device in space can be ascertained. The device can have an evaluation unit that is configured such that the orientation of the device relative to the plane can be ascertained on the basis of the orientation of the device in space. In addition, the device can have an inclination meter for measuring the inclination of the plane relative to the perpendicular. The inclination sensor can be situated on the plane. Preferably, the orientation sensor can be connected to an evaluation unit of the device, for example via a wireless communication connection.

Exemplary embodiments of the present invention are shown in the figures and are explained in more detail below.

DETAILED DESCRIPTION OF EXAMPLE EMBODIMENTS

Figure 1:
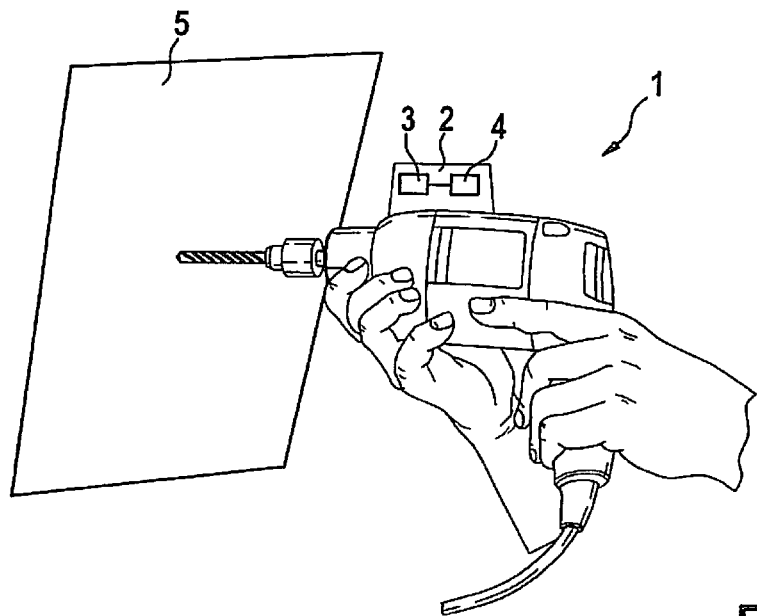
FIG. 1 shows, in a schematic representation, a drill having a device for ascertaining the orientation of the drill according to a first exemplary embodiment of the present invention.

FIG. 1 shows a drill 1 having a device 2 according to a first exemplary embodiment of the present invention. Device 2 is suitable for ascertaining the orientation of drill 1 relative to a wall or workpiece plane 5, this plane 5 being capable of being oriented perpendicular, i.e., parallel to the force of gravity, or at an inclination relative to the perpendicular. Device 2 has a connecting region that is fashioned in such a way that device 2 can be connected on the outer contour of drill 1, in particular on the upper side of drill 1. Device 2 has a laser distance measuring unit 3 and an evaluation unit 4 that are connected to one another via a signal connection, so that the distance data measured by laser distance measuring unit 3 can be communicated to evaluation unit 4. Laser distance measuring unit 3 is made such that from a prespecified position relative to plane 5, a first distance to a first point in plane 5 and a second distance to a second point in plane 5 can be measured. Evaluation unit 4 is configured such that on the basis of the first distance and the second distance the orientation of device 2, and thus also of drill 1, relative to plane 5 can be ascertained. On the basis of the ascertained orientation of drill 1 relative to plane 5, the user of drill 1 can be supported when orienting the drill or the drill bit.

Laser distance measuring unit 3 can have one or more laser distance meters that are fashioned such that a distance from a point in the plane can be measured through self-mixing of the laser light emitted by the laser distance meter with the laser light reflected at plane 5. The laser distance meter or meters are preferably fashioned as semiconductor lasers, in particular as vertical-cavity surface-emitting lasers (VCSEL). The semiconductor laser preferably has an integrated photodiode via which an optical or electrical quantity can be measured. In addition, the laser distance measuring unit can include a micromirror preferably fashioned as a MEMS (micro-electromechanical system).

In the following, further exemplary embodiments of a device 2 for ascertaining the orientation of a drill 1 relative to plane 5 are described that have the design described above. The description of the first exemplary embodiment thus holds equally for the following exemplary embodiments.

Figure 2:
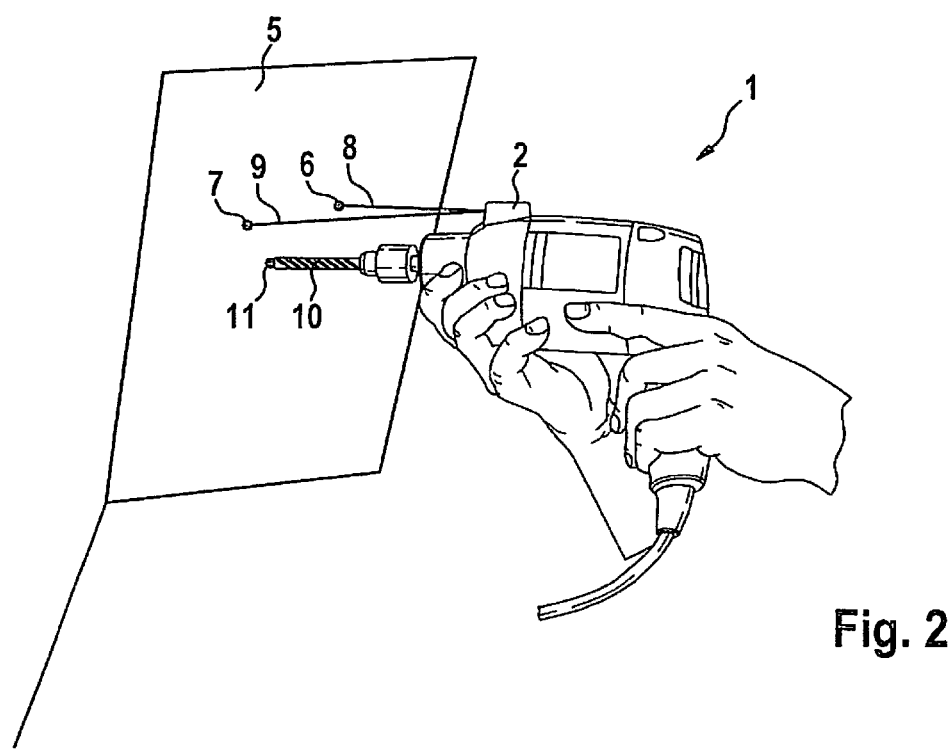
FIG. 2 shows, in a schematic representation, a drill having a device for ascertaining the orientation of the drill according to a second exemplary embodiment of the present invention.

FIG. 2 shows a drill 1 having a device 2 according to a second exemplary embodiment of the present invention. Laser distance measuring unit 3 of this device 2 has a first laser distance meter for measuring a first distance to a first point 6 and a second laser distance meter for measuring a second distance to a point 7. The two laser distance meters are oriented transverse to one another, so that the first laser distance meter emits a first laser beam 8 and the second laser distance meter emits a second laser beam 9 oriented transverse to first laser beam 8. Using laser distance meter 3, from a prespecified position relative to plane 5 the first distance to first point 6 of plane 5 and the second distance to second point 7 of plane 5 are now measured. In order to ascertain the orientation of drill 1 relative to plane 5, a third distance to a third point 11 of plane 5 is used. This third distance corresponds to the distance of device 2, or laser distance measuring unit 3, from plane 5 in a position of drill 1 in which a drill bit 10 of drill 1 touches the plane. The length of drill bit 10 is known. On the basis of the length of drill bit 10, the third distance to third point 11 is ascertained. On the basis of the first distance, the second distance, and the third distance, the orientation of drill 1 when drill bit 10 is placed onto plane 5 is determined using evaluation unit 4.

Figure 3:
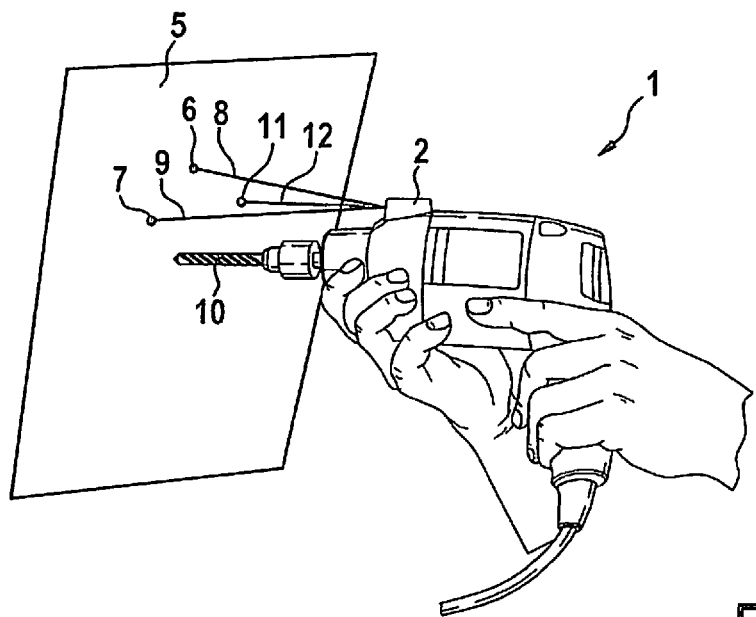
FIG. 3 shows, in a schematic representation, a drill having a device for ascertaining the orientation of the drill according to a third exemplary embodiment of the present invention.

FIG. 3 shows a drill 1 having a device 2 according to a third exemplary embodiment of the present invention. Differing from the second exemplary embodiment, laser distance measuring unit 3 of this device 2 has a third laser distance meter for measuring a third distance between device 2 and a third point 11 of plane 5. The third laser distance meter is oriented transverse to the first laser distance meter and transverse to the second laser distance meter, so that the third laser beam 12 emitted by the third laser distance meter impinges at a point 11 of plane 5 that does not lie on a common straight line with first point 6 and second point 7. In order to ascertain the orientation of drill 1 relative to plane 5, a method is used in which the first distance to first point 6, a second distance to second point 7, and a third distance to third point 11 are measured. On the basis of the three measured distances, the orientation of drill 1 relative to plane 5 is then determined using evaluation unit 4. This determination can take place before, during, and also after the actual drilling process.

Figure 4:
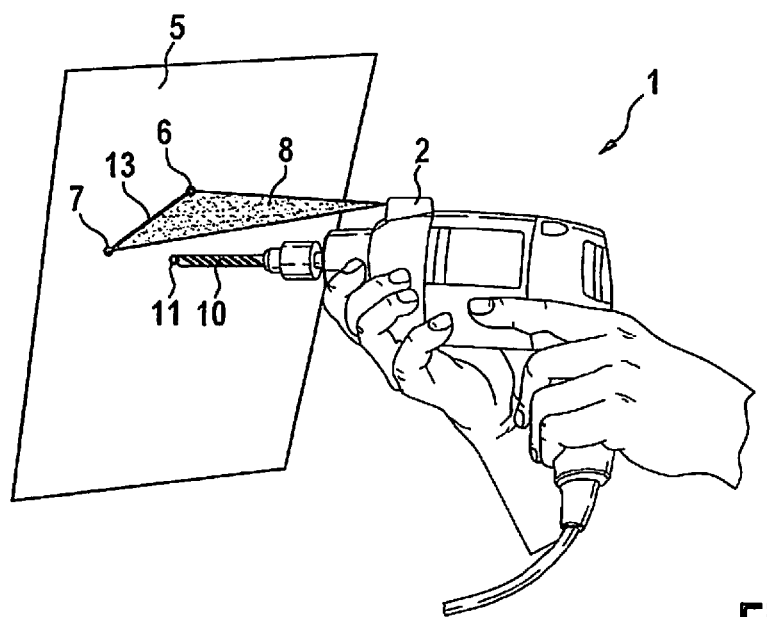
FIG. 4 shows, in a schematic representation, a drill having a device for ascertaining the orientation of the drill according to a fourth exemplary embodiment of the present invention.

FIG. 4 shows a drill 1 having a device 2 according to a fourth exemplary embodiment of the present invention. Laser distance measuring unit 3 of this device 2 has a first laser distance meter and a first micromirror, pivotable about a pivot axis, for deflecting a laser beam 8 of the first laser distance meter. When the first micromirror is pivoted, the laser beam of the first laser distance meter is deflected along a straight line 13, so that a first distance to a first point 6 and a second distance to a second point 7 are measured one after the other. In order to ascertain the orientation of drill 1 relative to plane 5, a third distance to a third point 11 of plane 5 is used. This third distance corresponds to the distance of device 2, or of laser distance measuring unit 3, from plane 5 in a position of drill 1 in which a drill bit 10 of drill 1 touches the plane. The length of drill bit 10 is known. On the basis of the length of drill bit 10, the third distance to third point 11 is ascertained. On the basis of the first distance, the second distance, and the third distance, the orientation of drill 1 when drill bit 10 is placed onto plane 5 is determined using evaluation unit 4.

Figure 5:
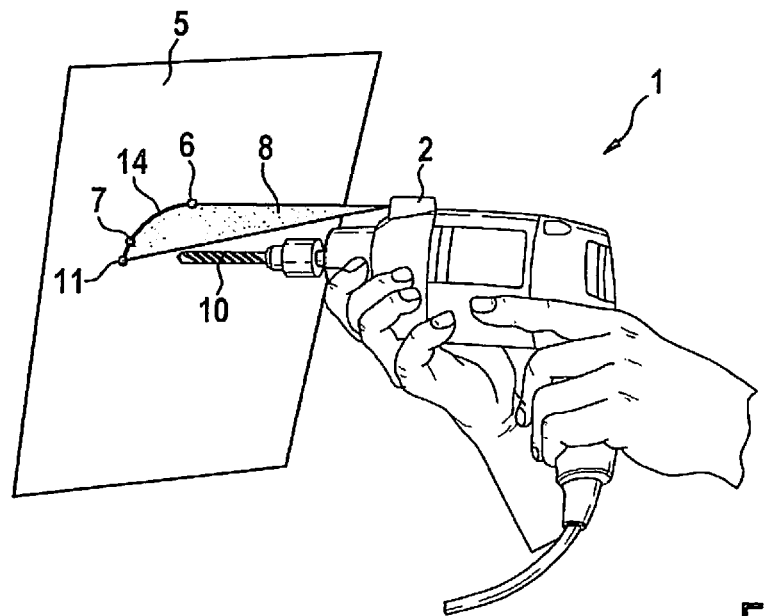
FIG. 5 shows, in a schematic representation, a drill having a device for ascertaining the orientation of the drill according to a fifth exemplary embodiment of the present invention.
Figure 6A:
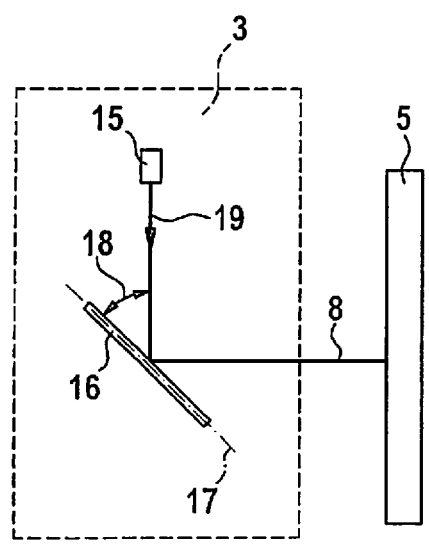
FIG. 6a shows, in a schematic representation, a laser distance measuring unit of the device according to FIG. 5.
Figure 6B:
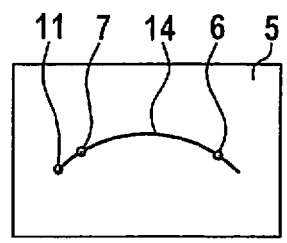
FIG. 6b shows an image of the laser beam of the laser distance measuring unit of the device according to FIG. 5 on the plane.

FIG. 5 shows a drill 1 having a device 2 according to a fifth exemplary embodiment of the present invention. As can be seen in FIGS. 6a and 6b, laser distance measuring unit 3 of this device 2 has a laser distance meter 15 and a micromirror 16, pivotable about a pivot axis 17, for deflecting a laser beam of laser distance meter 15. Laser distance meter 15 emits a laser beam in a direction of radiation 19. Pivot axis 17 of micromirror 16 encloses an acute angle 18 with direction of radiation 19. This means that angle 18 is greater than 0° and smaller than 90°. On the basis of acute angle 18, laser beam 8 deflected by micromirror 16 moves over a curved path 14 on plane 5, so that in succession the distances to three or more different points 6, 7, 11 of plane 5 are measured that are not situated on a common straight line. In this way, the laser beam of laser distance meter 15, radiated in direction of radiation 19, is deflected by micromirror 16, pivot axis 17 of micromirror 16 enclosing an acute angle 18 with direction of radiation 19, so that the image of laser beam 8 on plane 5 is distorted, and a curve 14 is scanned on plane 5. Curve 14 includes at least three points 6, 7, 11 that are not situated on a common straight line. In order to ascertain the orientation of drill 1 relative to plane 5, a method is used in which the distances to point 6, second point 7, and third point 11 are measured. On the basis of the three measured distances, the orientation of drill 1 relative to plane 5 is then determined using evaluation unit 4. This determination can take place before, during, and also after the actual drilling process.

Figure 7:
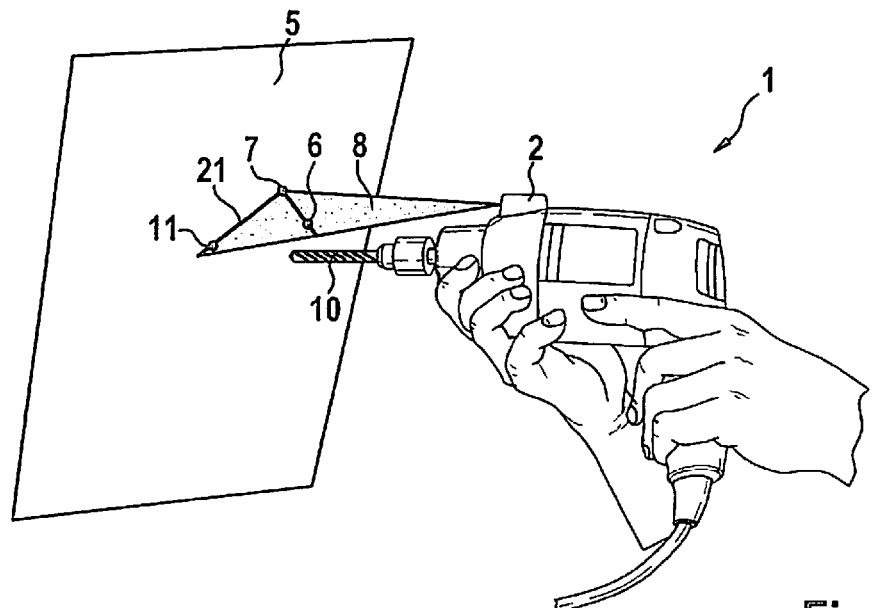
FIG. 7 shows, in a schematic representation, a drill having a device for ascertaining the orientation of the drill according to a sixth exemplary embodiment of the present invention.
Figure 8:
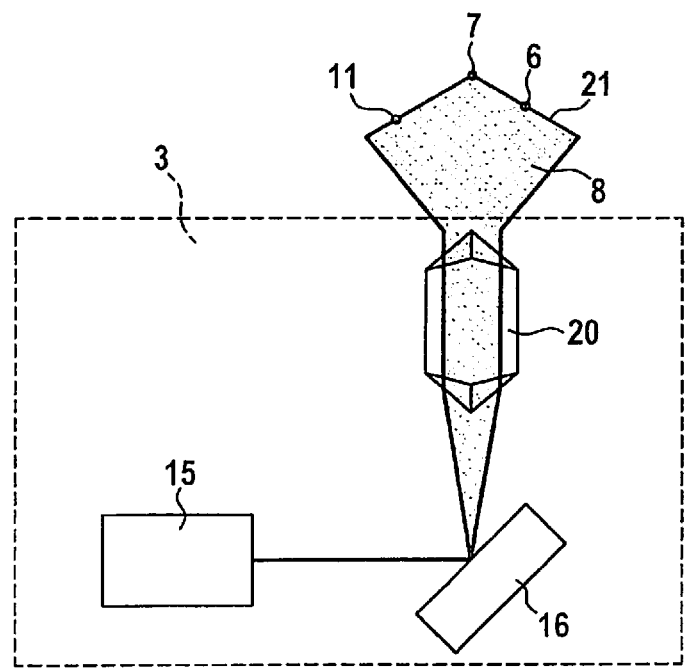
FIG. 8 shows, in a schematic representation, a laser distance measuring unit of the device according to FIG. 7.

FIG. 7 shows a drill 1 having a device 2 according to a sixth exemplary embodiment of the present invention. As can be seen in the representation of FIG. 8, laser distance measuring unit 3 of this device 2 has a laser distance meter 15 and a micromirror 16, pivotable about a pivot axis, for deflecting a laser beam of laser distance meter 15. In addition, laser distance measuring unit 3 includes a diverting optical mechanism 20, situated in the beam path after micromirror 16, for diverting the laser beam deflected by the first micromirror. Using the diverting optical mechanism, the laser beam can be diverted in such a way that the laser beam diverted by the diverting unit moves over a non-linear path 21 on plane 5. The non-linear path can for example be an angled path or a curved path. According to the sixth exemplary embodiment, diverting optical mechanism 20 has a prism via which the laser beam is diverted by refraction and/or total reflection. Path 21 includes at least three points 6, 7, 11 that are not situated on a common straight line. In order to ascertain the orientation of drill 1 relative to plane 5, a method is used in which the distances to point 6, second point 7, and third point 11 are measured. On the basis of the three measured distances, the orientation of drill 1 relative to plane 5 is then determined using evaluation unit 4. This determination can take place before, during, and also after the actual drilling process.

According to a modification of the sixth exemplary embodiment, the laser distance measuring unit has a first laser distance meter, a first micromirror pivotable about a pivot axis, a second laser distance meter, and a second micromirror pivotable about a pivot axis for deflecting a laser beam of the second laser distance meter. The second pivot axis is oriented transverse to the first pivot axis, so that the laser beam of the first laser distance meter is deflected along a first path and the laser beam of the second laser distance meter is deflected along a second path, the first path and the second path being oriented transverse to one another. Using a laser distance measuring unit according to this modification, a path can be scanned that corresponds to path 21 shown in FIG. 7.

Figure 9:
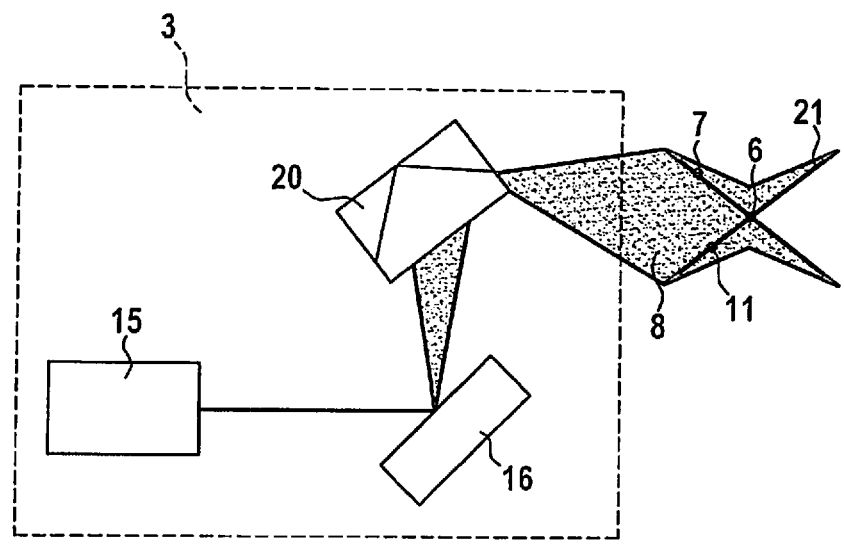
FIG. 9 shows, in a schematic representation, a drill having a device for ascertaining the orientation of the drill according to a seventh exemplary embodiment of the present invention.

FIG. 9 shows a laser distance measuring unit of the device 2 according to a seventh exemplary embodiment of the present invention that has a laser distance meter 15 and a micromirror 16, pivotable about a pivot axis, for deflecting a laser beam of laser distance meter 15. In addition, laser distance measuring unit 3 has a diverting optical mechanism 20 situated in the beam path after micromirror 16 for diverting the laser beam deflected by micromirror 16. According to the seventh exemplary embodiment, diverting optical mechanism 20 has one or more stationary diverting mirrors via which the laser beam is reflected. Laser beam 8 diverted by the diverting unit moves over a non-linear path 21 on plane 5 that includes at least three points 6, 7, 11 that are not situated on a common straight line. In order to ascertain the orientation of drill 1 relative to plane 5, a method is used in which the distances to point 6, second point 7, and third point 11 are measured. On the basis of the three measured distances, the orientation of drill 1 relative to plane 5 is then determined using evaluation unit 4. This determination can take place before, during, and also after the actual drilling process.

Figure 10:
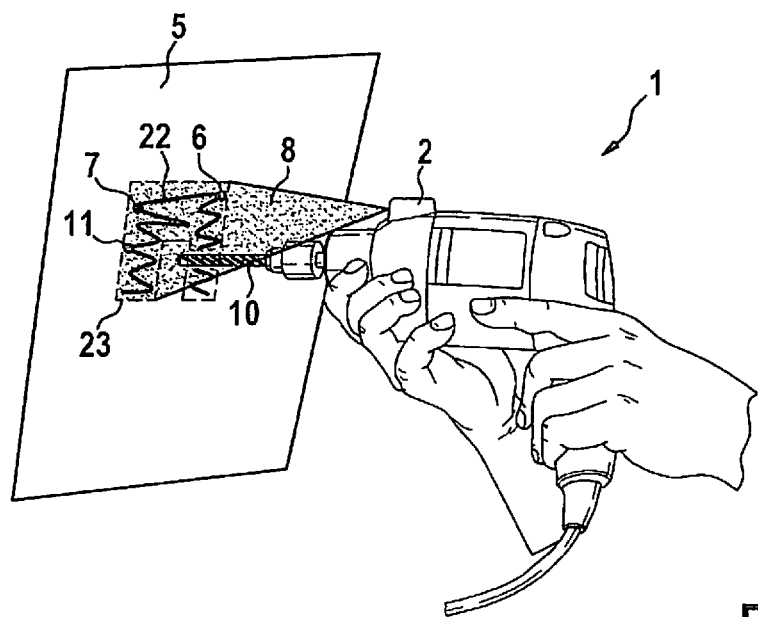
FIG. 10 shows, in a schematic representation, a drill having a device for ascertaining the orientation of the drill according to an eighth exemplary embodiment of the present invention.

FIG. 10 shows a drill 1 having a device 2 according to an eighth exemplary embodiment of the present invention. Device 2 has a laser distance measuring unit 3 having a laser distance meter 15 and a micromirror 16 for deflecting the laser beam of laser distance meter 15. The micromirror is pivotable about a first pivot axis and about a second pivot axis that is oriented transverse, in particular perpendicular, to the first pivot axis. Laser beam 8 can therefore be deflected in two spatial directions by the micromirror. It is possible to scan a flat region 23 of plane 5. Preferably, laser beam 8 deflected by the micromirror moves over a non-linear path 22 on plane 5 that includes at least three points 6, 7, 11 that are not situated on a common straight line. In order to ascertain the orientation of drill 1 relative to plane 5, a method is used in which the distances to point 6, second point 7, and third point 11 are measured. On the basis of the three measured distances, the orientation of drill 1 relative to plane 5 is then determined using evaluation unit 4. This determination can take place before, during, and also after the actual drilling process.

Figure 11:
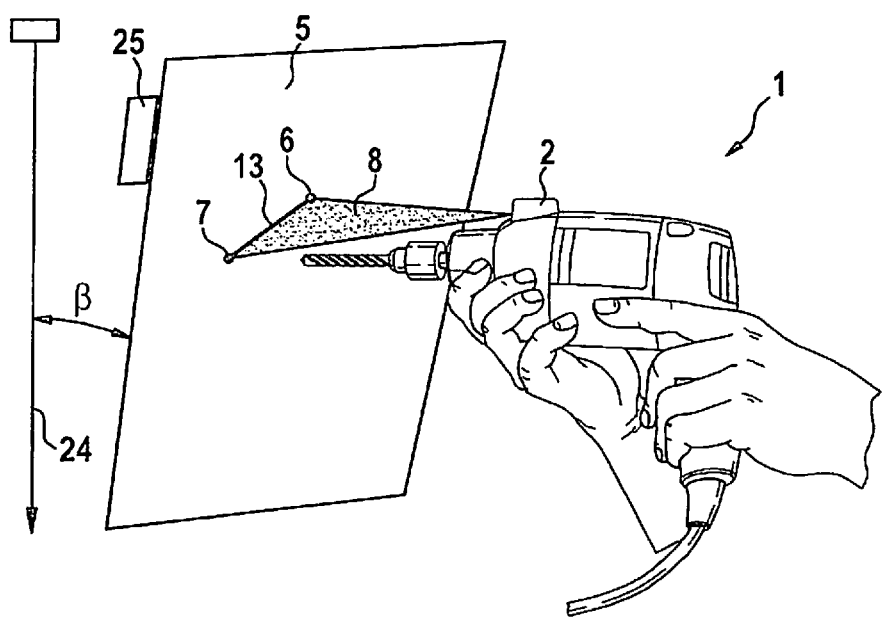
FIG. 11 shows, in a schematic representation, a drill having a device for ascertaining the orientation of the drill according to a ninth exemplary embodiment of the present invention.

FIG. 11 shows a drill 1 having a device 2 according to a ninth exemplary embodiment of the present invention. Device 2 has, in addition to the laser distance measuring unit, an orientation sensor via which the orientation of device 2 in space can be ascertained. The orientation sensor has a three-dimensional acceleration sensor, a three-dimensional rotational rate sensor, and a three-dimensional magnetometer. Particularly preferably, the orientation sensor is fashioned as a MEMS. Evaluation unit 4 of device 2 according to the ninth exemplary embodiment is configured in such a way that the orientation of device 2 relative to plane 5 can be ascertained on the basis of the distances to first point 6 and second point 7 of plane 5, and in addition on the basis of the orientation of device 2 in space, ascertained by the orientation sensor. In addition, the inclination of plane 5 relative to perpendicular 24 is communicated to the evaluation unit. The inclination can for example be measured by an inclination sensor 25 that is preferably connected to plane 5. The communication of the inclination measured by inclination sensor 25 to evaluation unit 4 of device 2 can take place via a wireless communication connection.

According to a modification of the ninth exemplary embodiment, device 2 can have an orientation sensor via which the orientation of the device in space can be ascertained, and can have an evaluation unit. The evaluation unit is connected via a wireless communication connection to an inclination sensor that determines the inclination of plane 5. According to the modification of the ninth exemplary embodiment, evaluation unit 4 is configured in such a way that the orientation of device 2 relative to plane 5 can be ascertained on the basis of the orientation of device 2 in space, ascertained by the orientation sensor, and on the basis of the measured inclination of plane 5.

What is claimed is:

1. A device for ascertaining the orientation of a drill relative to a plane, the device being connectable to the drill, comprising:
   a laser distance measuring unit by which, from a prespecified position relative to the plane, a first distance to a first point in the plane and a second distance to a second point in the plane can be measured; and an evaluation unit configured in such a way that the orientation of the device relative to the plane can be ascertained on the basis of the first distance and the second distance;

wherein the laser distance measuring unit has a first laser distance meter and a first micromirror, pivotable about a first pivot axis, for deflecting a laser beam of the first laser distance meter, wherein the laser beam can be radiated in a first direction of radiation by the first laser distance meter, wherein one of the following is satisfied: (i) the laser distance measuring unit has a second laser distance meter and a second micromirror, pivotable about a second pivot axis, for deflecting a laser beam of the second laser distance meter, or (ii) the first micromirror is pivotable about a second pivot axis that is situated perpendicular, to the first pivot axis of the first micromirror, and wherein the laser distance measuring unit includes a diverting optical mechanism situated so that a laser beam deflected by the first micromirror is divertable.

2. The device as recited in claim 1, wherein the laser distance measuring unit has a first laser distance meter for measuring the first distance and a second laser distance meter for measuring the second distance.

3. The device as recited in claim 2, wherein the laser distance measuring unit has a third laser distance meter for measuring a third distance between the device and a third point in the plane.

4. The device as recited in claim 1, wherein the first pivot axis of the first micromirror encloses an acute angle with the direction of radiation.

5. The device as recited in claim 4, wherein the laser distance measuring unit has the second laser distance meter and the second micromirror, pivotable about the second pivot axis, for deflecting a laser beam of the second laser distance meter.

6. The device as recited in claim 4, wherein the first micromirror is pivotable about the second pivot axis that is situated perpendicular, to the first pivot axis of the first micromirror.

7. The device as recited in claim 1, wherein the diverting optical mechanism has at least one of: (i) a prism, (ii) one or more stationary diverting mirrors, and/or (iii) a second micromirror that is pivotable about a further pivot axis that is situated perpendicular to the pivot axis of the first micromirror.

8. The device as recited in claim 1, wherein from the prespecified position relative to the plane, a third distance to a third point in the plane can be measured using the laser distance measuring unit, the third point not being situated on a common straight line with the first point and the second point, and the evaluation unit is configured in such a way that the orientation of the device relative to the plane can in addition be ascertained on the basis of the third distance.

9. The device as recited in claim 1, further comprising: an orientation sensor via which the orientation of the device in space is ascertainable.

10. A drill, comprising:
a device for ascertaining an orientation of a drill relative to a plane, the device being connectable to the drill wherein the device includes:
a laser distance measuring unit by which, from a prespecified position relative to the plane, a first distance to a first point in the plane and a second distance to a second point in the plane is measurable; and an evaluation unit configured so that the orientation of the device relative to the plane is ascertainable based on the first distance and the second distance;

wherein the laser distance measuring unit has a first laser distance meter and a first micromirror, pivotable about a first pivot axis, for deflecting a laser beam of the first laser distance meter, wherein the laser beam can be radiated in a first direction of radiation by the first laser distance meter, wherein one of the following is satisfied: (i) the laser distance measuring unit has a second laser distance meter and a second micromirror, pivotable about a second pivot axis, for deflecting a laser beam of the second laser distance meter, or (ii) the first micromirror is pivotable about a second pivot axis that is situated perpendicular, to the first pivot axis of the first micromirror, and wherein the laser distance measuring unit includes a diverting optical mechanism situated so that a laser beam deflected by the first micromirror is divertable.

11. A method for ascertaining an orientation of a drill relative to a plane, the method comprising:

measuring, by a laser distance measuring unit, from a prespecified position relative to the plane, a first distance to a first point in the plane and a second distance to a second point in the plane; and ascertaining, based on the first distance and the second distance, the orientation of the drill relative to the plane;

wherein the laser distance measuring unit has a first laser distance meter and a first micromirror, pivotable about a first pivot axis, for deflecting a laser beam of the first laser distance meter, wherein the laser beam can be radiated in a first direction of radiation by the first laser distance meter, wherein one of the following is satisfied: (i) the laser distance measuring unit has a second laser distance meter and a second micromirror, pivotable about a second pivot axis, for deflecting a laser beam of the second laser distance meter, or (ii) the first micromirror is pivotable about a second pivot axis that is situated perpendicular, to the first pivot axis of the first micromirror, and wherein the laser distance measuring unit includes a diverting optical mechanism situated so that a laser beam deflected by the first micromirror is divertable.

* * * * *